United States Patent
Inage et al.

(10) Patent No.: US 7,144,091 B2
(45) Date of Patent: Dec. 5, 2006

(54) BRAKE APPARATUS WITH ORIFICES FOR RESTRICTING BRAKE FLUID PRESSURE PULSATION

(75) Inventors: Shozo Inage, Anjo (JP); Hidehiro Kinoshita, Nagoya (JP); Nobuhiko Yoshioka, Anjo (JP); Takahiro Yamaguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/369,199

(22) Filed: Feb. 20, 2003

(65) Prior Publication Data

US 2003/0209940 A1  Nov. 13, 2003

(30) Foreign Application Priority Data

Feb. 20, 2002 (JP) .............................. 2002-043352

(51) Int. Cl.
*B60T 8/36* (2006.01)
(52) U.S. Cl. ...................... 303/119.3; 303/DIG. 10; 303/10
(58) Field of Classification Search ................ 303/900, 303/116.1–119.3, 87, 61; 138/37, 46, 45, 138/40; 251/129.01, 118
See application file for complete search history.

(56) References Cited

U.S. PATENT DOCUMENTS

| | | | | |
|---|---|---|---|---|
| 4,552,414 A | * | 11/1985 | Fujii et al. ............... | 303/115.4 |
| 4,668,024 A | * | 5/1987 | Nakanishi et al. ....... | 303/119.3 |
| 4,952,002 A | * | 8/1990 | Arikawa et al. ......... | 303/116.1 |
| 4,957,330 A | * | 9/1990 | Morikawa et al. ....... | 303/115.4 |
| 5,028,096 A | * | 7/1991 | de la Broise ............ | 303/115.4 |
| 5,143,428 A | * | 9/1992 | Toda et al. ............... | 303/113.5 |
| 5,172,956 A | * | 12/1992 | Klose et al. ............. | 303/10 |
| 5,221,129 A | * | 6/1993 | Takasaki .................. | 303/119.2 |
| 5,295,739 A | * | 3/1994 | Burgdorf et al. ......... | 303/113.1 |
| 5,370,450 A | * | 12/1994 | Volz et al. ............... | 303/119.2 |
| 5,405,191 A | * | 4/1995 | Nishiyama et al. ...... | 303/113.2 |
| 5,509,729 A | * | 4/1996 | Zaviska et al. .......... | 303/117.1 |
| 5,577,813 A | * | 11/1996 | Zaviska .................. | 303/116.4 |
| 5,967,627 A | * | 10/1999 | Hosoya et al. ........... | 303/119.2 |
| 6,000,764 A | * | 12/1999 | Dokas ..................... | 303/116.4 |
| 6,003,957 A | * | 12/1999 | Toda et al. ............... | 303/10 |
| 6,003,958 A | * | 12/1999 | Volz et al. ............... | 303/116.1 |
| 6,082,833 A | * | 7/2000 | Hosoya ................... | 303/119.2 |
| 6,182,502 B1 | * | 2/2001 | Schwegler et al. ...... | 73/49.2 |
| 6,267,457 B1 | * | 7/2001 | Siegel et al. ............ | 303/116.4 |
| 6,276,764 B1 | * | 8/2001 | Park ....................... | 303/119.2 |
| 6,364,430 B1 | * | 4/2002 | Park ....................... | 303/119.2 |

FOREIGN PATENT DOCUMENTS

| | | | |
|---|---|---|---|
| DE | 004030859 A1 | * | 4/1992 |
| JP | 5-139277 | * | 6/1993 |

* cited by examiner

*Primary Examiner*—Robert A. Sicolnolfi
(74) *Attorney, Agent, or Firm*—Posz Law Group, PLC (57) ABSTRACT

In a brake apparatus, a pump sucks brake fluid and discharges the brake fluid through a pump discharge conduit. Orifices are connected in series with one another with respect to brake fluid flow discharged from the pump and restrict the brake fluid flow. Because the orifices are formed for restricting brake fluid pulsation, the brake fluid pressure discharged from the pump decreases gradually. Therefore, cavitations are not generated at lower reaches of the orifices because the brake fluid pressure does not decrease rapidly. As a result, the brake apparatus decreases or restricts undesirable noise.

20 Claims, 5 Drawing Sheets

BRAKE APPARATUS WITH ORIFICES FOR RESTRICTING BRAKE FLUID PRESSURE PULSATION

CROSS REFERENCE TO RELATED APPLICATIONS

This application is based upon and claims the benefit of Japanese Patent Application No. 2002-43352 filed on Feb. 20, 2002, the contents of which are incorporated herein by reference.

FIELD OF THE INVENTION

The present invention relates to vehicle brake apparatuses, and specifically to a brake apparatus with a pump that discharges brake fluid in a manner that decreases brake fluid pulsation.

BACKGROUND OF THE INVENTION

A typical vehicle brake apparatus performs a primary check period to check for malfunctions of components thereof such as a pump and electromagnetic valves by activating the components when an engine starts. Thus, reliability of the brake apparatus increases. During the primary check period, the brake fluid circulates through the pump, an orifice formed at a fluid discharge port of the pump, the electromagnetic valves, a reservoir and the pump.

The above mentioned orifice is formed for restricting brake fluid pulsation to decrease operational noise from the brake apparatus when brake fluid pressure discharged from the pump is high and brake fluid pulsation is high such as, for example, during antilock brake control.

However, in the brake apparatus mentioned above, since the brake fluid pulsation is decreased by only one orifice, the brake fluid pressure rapidly decreases due to the orifice. When the brake fluid pressure discharged from the pump is relatively low and is, for example, at atmospheric pressure during the primary check period or the like, cavitations generate at lower reaches of the orifice due to the rapid brake fluid pressure decrease. As a result, the brake apparatus generates undesirable noise.

SUMMARY OF THE INVENTION

It is therefore an object of the present invention to provide a brake apparatus that is capable of obviating the above problems.

It is another object of the present invention to provide a brake apparatus that is capable of decreasing operational noise from the brake apparatus.

According to a brake apparatus of the present invention, a pump sucks brake fluid and discharges the brake fluid through a pump discharge conduit. Orifices connected in series one another with respect to brake fluid flow discharged from the pump restrict the brake fluid flow.

Accordingly, since the brake fluid pressure discharged from the pump decreases gradually, cavitations are not generated at lower reaches of the orifices because the brake fluid pressure does not rapidly decrease. As a result, the brake apparatus decreases undesirable noise.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

The present invention will be described further with reference to various embodiments shown in the drawings.

(First Embodiment)

Figure 1:
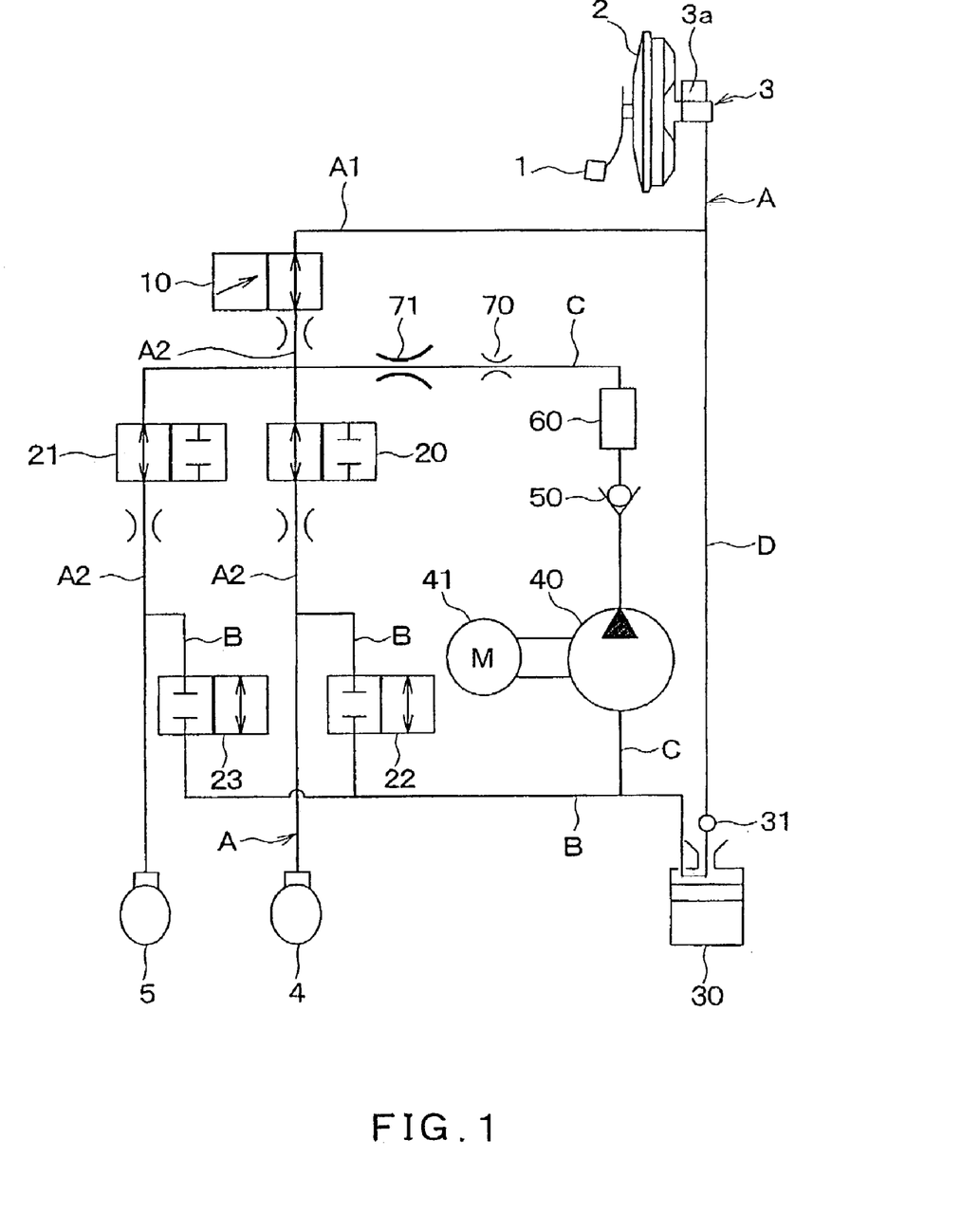
FIG. 1 shows a schematic view of a brake apparatus according to a first embodiment of the present invention.
Figure 2:
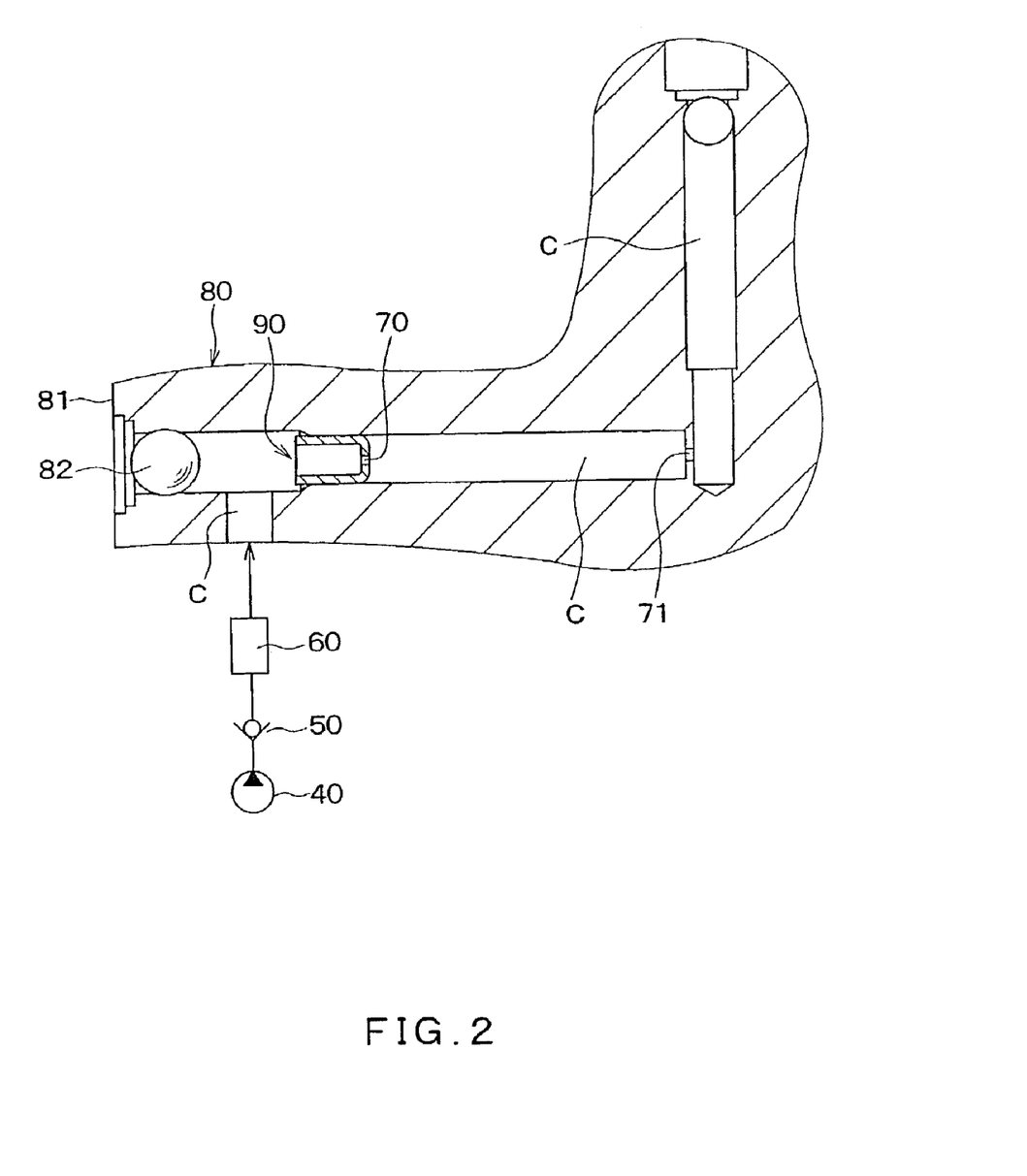
FIG. 2 shows a cross sectional view of the brake apparatus including orifices according to the first embodiment.

A first embodiment of the present invention is described with reference to FIGS. 1, 2. FIG. 1 shows an outline structure of a brake apparatus including orifices 70, 71. FIG. 2 shows an enlarged cross sectional view of the brake apparatus in the vicinity of the orifices 70, 71.

The structure of the brake apparatus will be described with reference to FIG. 1. In this embodiment, a brake apparatus is implemented in a front wheel drive vehicle provided with an X-shaped conduit configuration having a first conduit connecting wheel cylinders of a front right wheel and a rear left wheel, and a second conduit connecting wheel cylinders of a front left wheel and a rear right wheel.

As shown in FIG. 1, a brake pedal 1 is connected to a booster 2. The booster 2 boosts brake depression force and includes a pushrod for transmitting boosted depression force to a master cylinder 3. The master cylinder 3 generates master cylinder pressure when the pushrod pushes a master piston arranged in the master cylinder 3. The master cylinder 3 includes a master reservoir 3a for supplying brake fluid into the master cylinder 3 or for storing extra brake fluid of the master cylinder 3. The brake pedal 1, the booster 2 and the master cylinder 3 correspond to a brake fluid pressure generating portion of the brake apparatus.

The master cylinder pressure is transmitted to a wheel cylinder 4 for a front right wheel (FR) and a wheel cylinder 5 for a rear left wheel (RL) via an actuator provided in the brake apparatus. In the following explanation, the brake apparatus will now be described with respect to the first conduit connecting the wheel cylinders of the front right wheel (FR) and the rear left wheel (RL). The explanation for the second conduit connecting the wheel cylinders of the front left wheel (FL) and the rear right wheel (RR) will be omitted since a hydraulic circuit of the second conduit is similar to that of the first conduit. The wheel cylinders 4, 5 correspond to a brake force generating portion of the brake apparatus.

The brake apparatus includes a conduit (main conduit) A connected to the master cylinder 3. A linear valve 10 is disposed in the main conduit A. The main conduit A is divided into two portions by the linear valve 10. That is, the main conduit A is divided into a first main conduit A1 from the master cylinder 3 to the linear valve 10 and a second main conduit A2 from the linear valve 10 to the respective wheel cylinders 4, 5.

The linear valve 10 is set to an open state in a normal braking operation, and is controlled by an electronic control unit for the brake apparatus (not shown; hereinafter referred to as an ECU). The linear valve 10 is operated by duty control into a half open status during a brake assist control period in which a predetermined pressure higher than the master cylinder pressure is applied to the respective wheel cylinders 4, 5 because the master cylinder pressure is lower than a requisite pressure or during a traction control period in which driving forces of driven wheels are controlled by applying a brake force to the driven wheels. Therefore, a pressure difference between the first main conduit A1 located on the side of the master cylinder 3 and the second main conduit A2 located on the side of the wheel cylinders 4, 5 is maintained at a predetermined value.

The second main conduit A2 branches into two conduits, one of which is connected to the wheel cylinder 4 and the other of which is connected to the wheel cylinder 5. A first pressure increasing control valve 20 for controlling an increase in brake fluid pressure of the wheel cylinder 4 is installed in one of the branched conduits, and a second pressure increasing control valve 21 for controlling an increase in brake fluid pressure of the wheel cylinder 5 is installed in the other one of the branched conduits.

The first and second pressure increasing control valves 20, 21 are two-position valves, each of which is capable of being controlled to open and close states by an ECU (not shown). When the two-position valves are controlled to the open state, the master cylinder pressure or the brake fluid pressure produced by a pump 40 can be applied to the respective wheel cylinders 4, 5. During normal braking operation in which ABS control or the like is not carried out by the ECU, the first and second pressure increasing control valves 20, 21 are set to the open state.

A pressure reducing conduit B connects a portion of the second main conduit A2 located between the respective pressure increasing control valves 20, 21 and the respective wheel cylinders 4, 5 to a reservoir 30 for temporarily reserving the brake fluid transmitted from the second main conduit A2. First and second pressure reducing control valves 22, 23 are installed in the pressure reducing conduit B. The first and second pressure reducing control valves 22, 23 are two-position valves, each of which is capable of being controlled to open and close states by the ECU. During normal braking operation, the first and second pressure reducing control valves 22, 23 are set to the close state.

A pump conduit C connects a portion of the pressure reducing conduit B located between the respective pressure reducing control valves 22, 23 to a portion of the main conduit A located between the linear valve 10 and the respective pressure increasing control valves 20, 21. An auxiliary conduit D is connected to the reservoir 30 through a control valve 31 and a portion of the main conduit A located between the master cylinder 3 and the linear valve 10. The control valve 31 is set to an open state during a non-braking operation, and is set to a close status during a normal brake state.

The pump 40 is controlled by a motor 41 and is installed in the pump conduit C. The pump 40 sucks the brake fluid from the reservoir 30 and then discharges it to the second main conduit A2 to increase the brake fluid pressure. A portion of the pump conduit C located between the pump 40 and the second main conduit A2 corresponds to a pump discharge conduit.

In the pump discharge conduit of the pump conduit C, a check valve 50, a damper 60, and first and second orifices 70, 71 are installed as mentioned in order to be connected in series with respect to a brake fluid flow. The damper 60 is formed by a chamber, in which a cross sectional area is larger than that of the pump discharge conduit of the pump conduit C, for restricting pulsation of the brake fluid discharged from the pump 40. The first and second orifices 70, 71 are formed by decreasing a cross sectional area of the pump discharge conduit of the pump conduit C for restricting pulsation of the brake fluid discharged from the pump 40. Each of the first and second orifices 70, 71 is configured by a fixed-type orifice in which the cross sectional area is fixed.

Detailed configurations of the first and second orifices 70, 71 will now be described with reference to FIG. 2. FIG. 2 shows a cross sectional view of a housing 80 of the brake apparatus including the first and second orifices 70, 71. Specifically, FIG. 2 shows a part of the housing 80 around the pump discharge conduit of the pump conduit C. The respective conduits A, B, D, the reservoir 30 and the control valve 31 are not shown in FIG. 2. However, respective components mentioned above are located in the housing 80.

The pump conduit C and the orifice 71 are integrated in the housing 80. Specifically, the housing 80 is drilled from two surfaces thereof to form two parts of the pump conduit C. Then, the housing 80 is drilled again to communicate the two parts of the pump conduit C by the orifice 71 having a cross sectional area smaller than that of the pump conduit C.

The orifice 70 is formed on a bottom portion of a brake fluid flow restriction portion 90, which has a cup-shaped configuration and is separated from the housing 80. The orifice 70 is located in the pump conduit C by, for example, press-fitting the flow restriction portion 90 into the pump conduit C. After the orifice 70 is formed, a ball 82 is press-fitted into an opening of the housing 80 for closing the opening of the pump conduit C.

In the configuration mentioned above, the orifice 70, which located on a side closer to a surface of the housing 80 than the orifice 71, is defined by the flow restriction portion 90, and the orifice 71, which is located on a side that is more distant from the surface of the housing 80 relative to the orifice 71, is defined by a portion of the housing 80. Therefore, the orifices 70, 71 are connected in series in the pump conduit C.

Operation of the brake apparatus during a primary check period will now be described with reference to FIG. 1. Incidentally, FIG. 1 corresponds to a brake apparatus status when the brake pedal 1 is not depressed. In other words, the first and second pressure reducing control valves 22, 23 are set to the close states, and therefore the brake fluid can be transmitted between the master cylinder 3 and the respective wheel cylinders 4, 5 based on the depression force applied to the brake pedal 1.

When the engine (not shown) starts, the primary check period is executed by the ECU. With predetermined currents for the primary check period, malfunctions of the linear control valve 10, the first and second pressure increasing control valves 20, 21 and the first and second pressure reducing control valves 22, 23 are checked. Further, with a predetermined current for the primary check period, a malfunction of the motor 41 is checked.

When the pump 40 is activated due to operation of the motor 41, the pump 40 sucks the brake fluid from the first main conduit A1 via the auxiliary conduit D, the reservoir 30 and the pump conduit C, and then discharges it into the second main conduit A2 via the pump conduit C. When the pump 40 is available for the primary check period, the brake fluid flows sequentially through the pump 40, the check valve 50, the damper 60, the first and second orifices 70, 71, the linear control valve 10, the control valve 31, the reservoir 30 and the pump 40. The brake fluid pressure discharged from the pump 40 is decreased gradually by the first and second orifices 70, 71. Therefore, cavitations are not generated at lower reaches of the first and second orifices 70, 71 because the brake fluid pressure does not decrease rapidly. As a result, the brake apparatus decreases or restricts undesirable noise.

Because two orifices are formed for restricting the brake fluid pulsation, radii of the first and second orifices 70, 71 can be enlarged compared with a case in which only one orifice is formed. Consequently, manufacture of the first and second orifices 70, 71 is not difficult, and the pump conduit C is prevented from clogging due to foreign objects in the brake fluid.

Furthermore, if one of the first and second orifices 70, 71 is destroyed because a radius thereof enlarges, the other one can operate to restrict the brake fluid pulsation.

(Second Embodiment)

Figure 3:
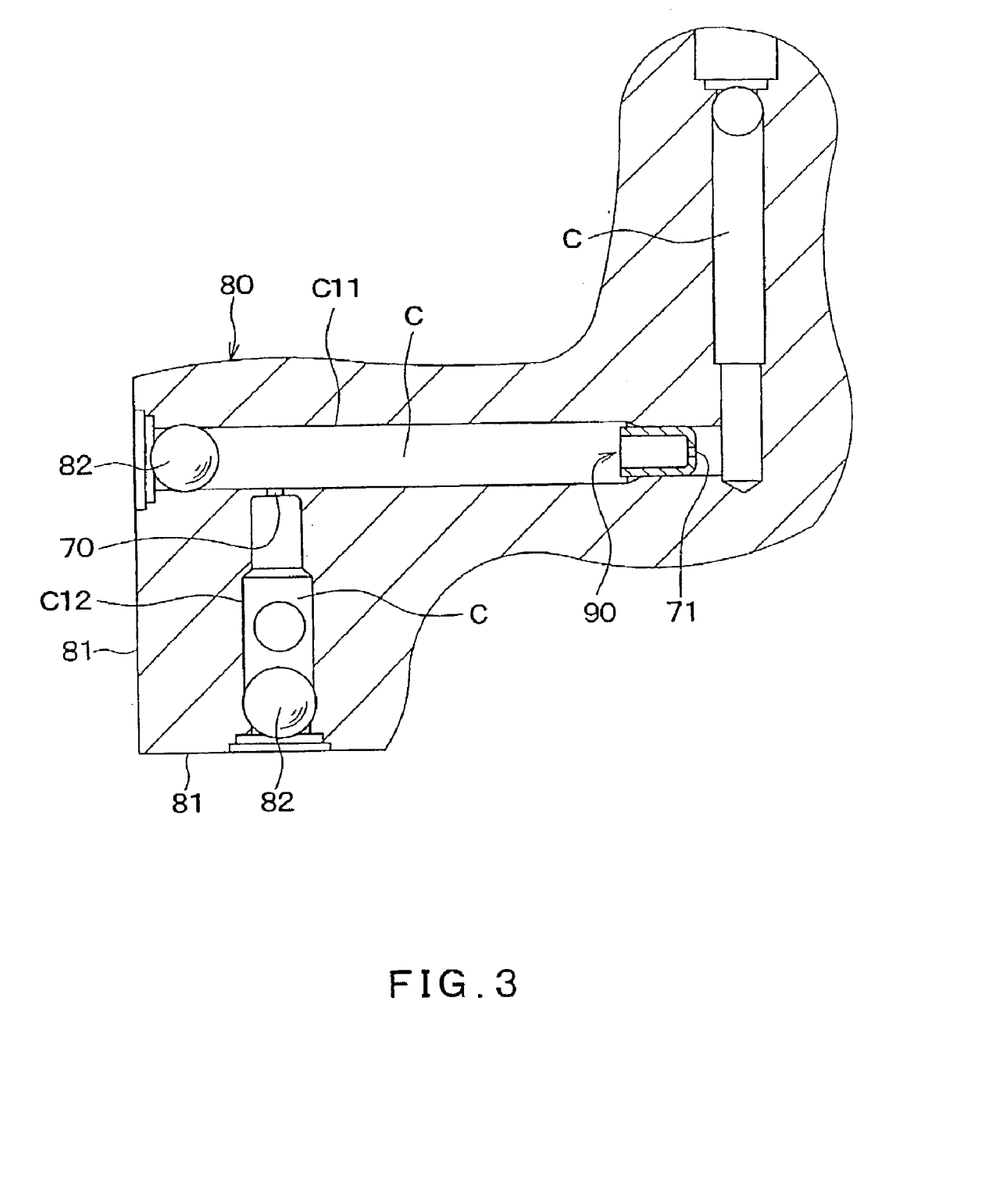
FIG. 3 shows a cross sectional view of the brake apparatus including orifices according to a second embodiment of the present invention.

A second embodiment of the present invention is described with reference to FIG. 3. FIG. 3 shows a cross sectional view on a discharge side of a pump conduit C of a brake apparatus including first and second orifices 70, 71. The other portions are the same as in the brake apparatus in the first embodiment.

In the present embodiment, the pump conduit C includes two conduits C11, C12 having first and second orifices 70, 71, respectively. The conduits C11, C12 are formed by drilling from surfaces of a housing 80. A cup-shaped brake fluid flow restriction portion 90 includes a bottom portion from which the orifice 71 is formed and is located in the conduit C11 by press-fitting. The orifice 70 is formed by penetrating a bottom portion of the conduit C12 to communicate with the conduit C11. According to the brake apparatus, the orifice 70, which is located on a closer side from the surface of the housing 80 relative to the orifice 71, is configured by a portion of the housing 80, and the orifice 71, which is located on a far side from the surface of the housing 80 relative to the orifice 71, is configured by the flow restriction portion 90.

(Third Embodiment)

Figure 4:
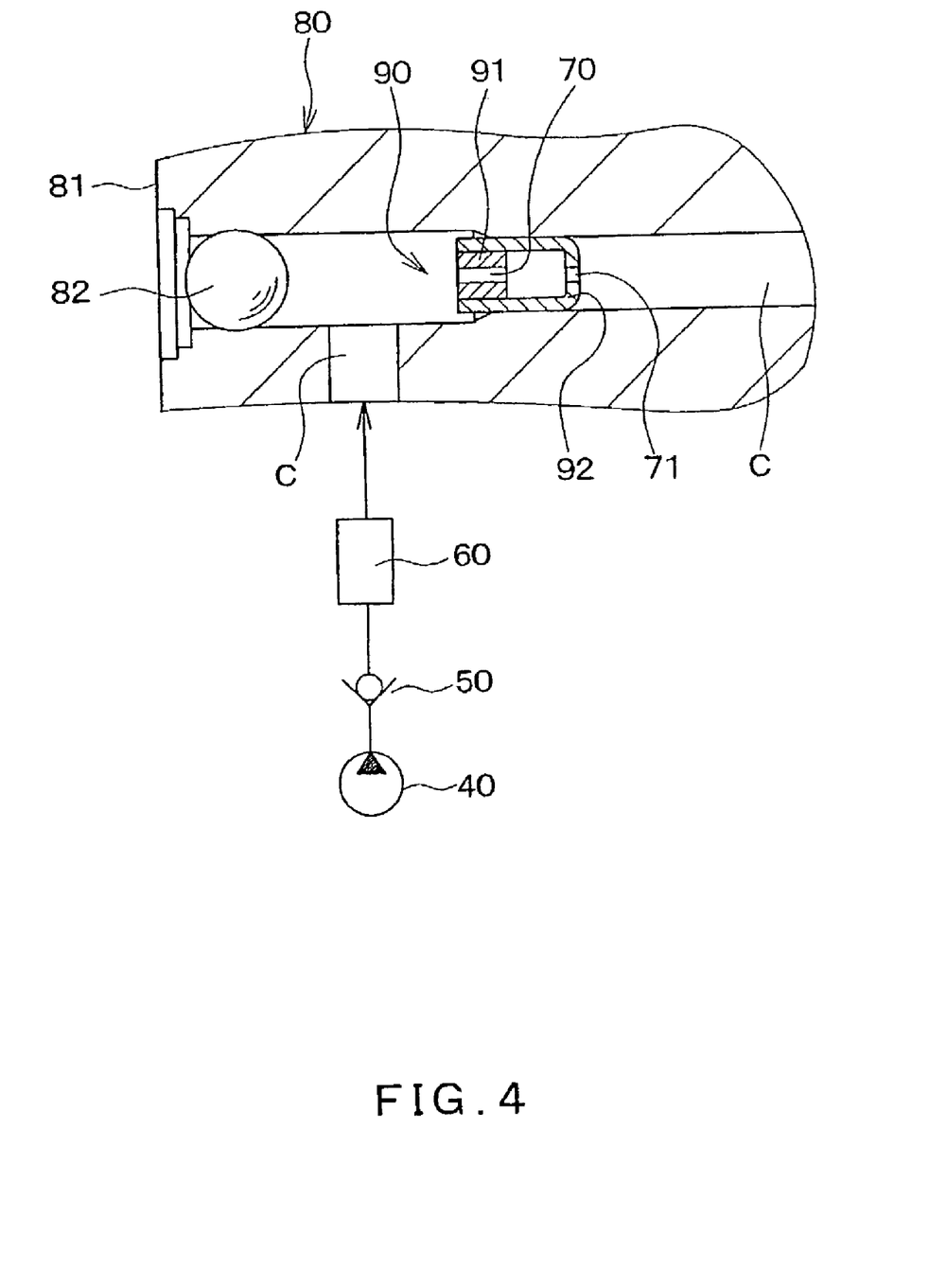
FIG. 4 shows a cross sectional view of the brake apparatus including orifices according to a third embodiment of the present invention.

A third embodiment of the present invention is described with reference to FIG. 4. FIG. 4 shows a cross sectional view on a discharge side of a pump conduit C of a brake apparatus including first and second orifices 70, 71. The other portions are the same as in the brake apparatus in the first embodiment.

In the present embodiment, the first and second orifices 70, 71 are integrated in a brake fluid flow restriction portion 90. The flow restriction portion 90 includes a cylindrical portion (a first flow restriction portion) 91 having the first orifice 70 and a cup-shaped portion (a second flow restriction portion) 92 having the second orifice 71. The cylindrical portion 91 is integrally press-fitted into the cup-shaped portion 92. The flow restriction portion 90 is press-fitted into the pump conduit C so as to be installed on a discharge side of the pump conduit C.

According to the brake apparatus of the present embodiment, the orifices 70, 71 can be simplified relative to the first and second embodiments.

(Fourth Embodiment)

Figure 5:
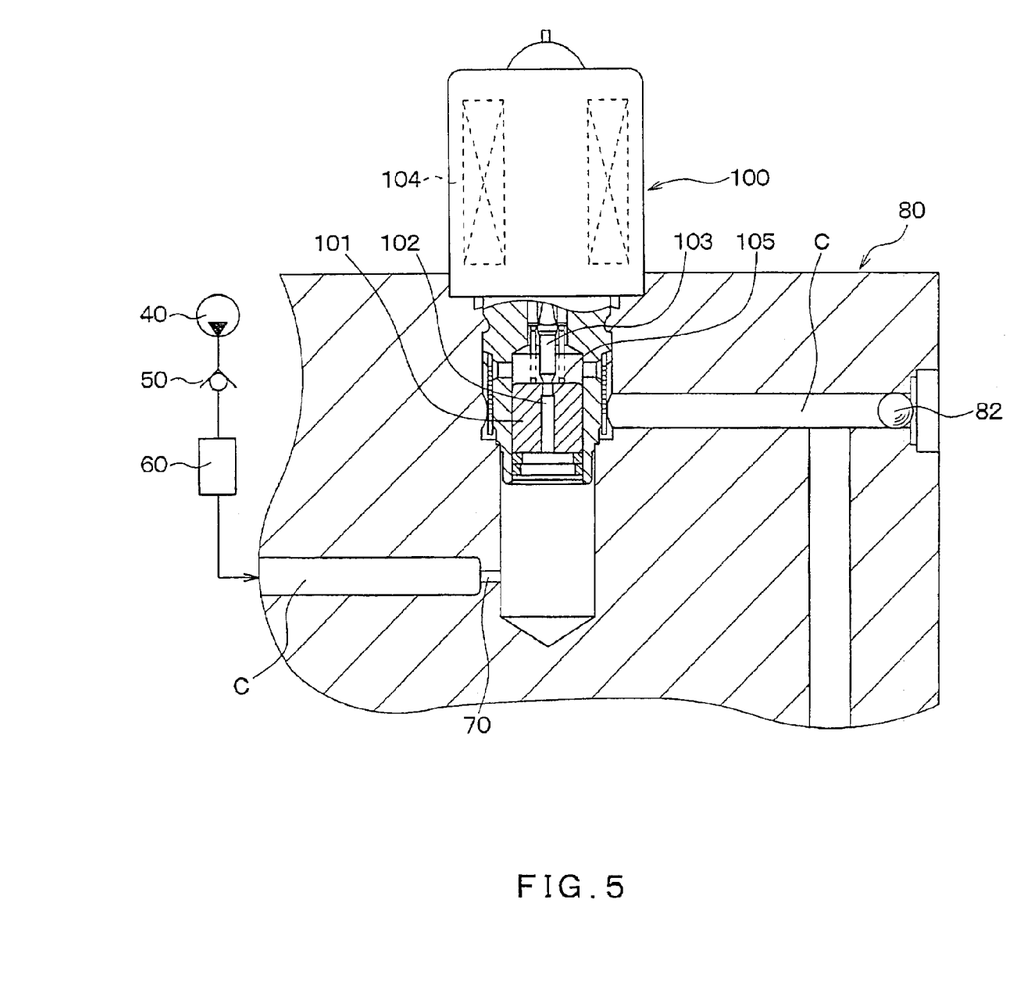
FIG. 5 shows a cross sectional view of the brake apparatus including orifices according to a fourth embodiment of the present invention.

A fourth embodiment of the present invention is described with reference to FIG. 5. FIG. 5 shows a cross sectional view on a discharge side of a pump conduit C of a brake apparatus including first and second orifices 70, 71. The other portions are the same as in the brake apparatus in the first embodiment.

In the present embodiment, one of the first and second orifices 70, 71 is configured by a variable type orifice having an orifice in which the cross sectional area is variable. A brake fluid flow restriction valve 100 corresponding to the variable type orifice is located at a lower side of the first flow restriction portion 70 formed by a fixed type orifice. The flow restriction valve 100 includes a valve seat 101 having a penetration hole 102, a valve body 103, a coil 104 and a spring 105. A tip portion of the valve body 103 opens and closes the penetration hole 102, and a pump conduit C communicates via the penetration hole 102 when the tip portion of the valve body 103 opens the penetration hole 102. Current flow supplied to the coil 104 is duty-controlled. Because magnetic suction force by the coil 104 is defined based on a duty ratio, a position of the valve body 103 is arranged by a relationship between the magnetic suction force and spring force of the spring 105. Consequently, a cross sectional area at an end portion of the penetration hole 102 (hereinafter referred to as an orifice area) is controlled.

According to the brake apparatus of the present embodiment, the orifice area is changed by the flow restriction valve 100 the based on a vehicle status or the like. Therefore, the brake apparatus can restrict the pulsation by decreasing the orifice area when a brake fluid pressure discharged from the pump is high and the brake fluid pulsation is high, for example, during an antilock brake control. Further, the brake apparatus restricts cavitations by increasing the orifice area when the brake fluid pressure discharged from the pump is relatively low and is, for example, at atmospheric pressure during the primary check period or the like.

A portion at which the cavitations generate easily during the primary check period is a portion at which brake fluid pressure is approximately equal to atmospheric pressure. Therefore, the flow restriction valve 100 is located at lower reaches of the first orifice 70 at which the brake fluid pressure is approximately equal to atmospheric pressure, and the orifice area is increased during the primary check period. As a result, the brake apparatus appropriately restricts cavitations.

(Modifications)

In the first to fourth embodiments, two orifices (the first and second orifices 70, 71) are formed in the pump discharge conduit of the pump conduit C in order to restrict the pulsation of the brake fluid discharged from the pump 40. However, three or more orifices can alternatively be formed in the brake apparatus. In other words, in the present invention, a plurality of orifices may be included in the pump discharge conduit of the brake apparatus.

In the first to third embodiments, at least one of the orifices 70, 71 is formed by the flow restriction portion 90. However, all orifices can alternatively be integrated into the housing 80.

While the above description is of the preferred embodiments of the present invention, it should be appreciated that the invention may be modified, altered, or varied without deviating from the scope and fair meaning of the following claims.

What is claimed is:

1. A vehicle brake apparatus comprising:
    a brake fluid pressure generating portion for generating brake fluid pressure based on brake pedal operation that is operable according to a requisite braking force;
    a brake force generating portion for generating the requisite braking force based on the brake fluid pressure generated by the brake fluid pressure generating portion;

a main conduit connected to the brake fluid pressure generating portion for transmitting the brake fluid pressure to the brake force generating portion;

a pump for sucking and discharging brake fluid;

a pump discharge conduit for transmitting the brake fluid discharged from the pump to the main conduit;

a damper for restricting pulsation of the brake fluid, the damper being located in the pump discharge conduit farther along a flow path of the brake fluid than the pump; and orifices connected in series with one another with respect to brake fluid flow discharged from the pump, and for restricting the brake fluid flow, the orifices being located in the pump discharge conduit farther along a flow path of the brake fluid than the damper, wherein orifice cross section areas of each of the orifices are smaller than a conduit cross section area of the pump discharge conduit, both before and after each of the orifices.

2. The vehicle brake apparatus according to claim 1, wherein at least one of the orifices is a variable type orifice having a variable cross sectional area.

3. The vehicle brake apparatus according to claim 1, wherein all of the orifices are fixed type orifices in which a cross sectional area is fixed.

4. The vehicle brake apparatus according to claim 1, further comprising:

a housing including the pump discharge conduit;

wherein at least one of the orifices is integrated in the housing, and at least one of the orifices is formed by a brake fluid flow restriction portion separate from the housing, and the brake fluid restriction portion is attached in the pump discharge conduit in the housing.

5. The vehicle brake apparatus according to claim 4, wherein the at least one of the orifices that is integrated in the housing is located on a side closer to a surface of the housing compared with the at least one of the orifices that is formed by a brake fluid flow restriction portion, and the at least one of the orifices that is formed by the brake fluid flow restriction portion is located on a side farther from the surface of the housing compared with the at least one of the orifices that is formed by a brake fluid flow restriction portion.

6. The vehicle brake apparatus according to claim 4, wherein the at least one of the orifices that is integrated in the housing is located on a side farther from a surface of the housing on which the pump discharge conduit is formed, compared with other of the orifices that are not integrated in the housing, and the at least one of the orifices that is formed by the brake fluid flow restriction portion is located on side closer to the surface of the housing compared with other of the orifices that are not formed by the brake flow restriction portion.

7. The vehicle brake apparatus according to claim 4, wherein the brake flow restriction portion is a cup-shaped portion having a bottom portion on which the at least one of the orifices is formed.

8. The vehicle brake apparatus according to claim 1, further comprising:

a housing including the pump discharge conduit;

wherein each of the orifices is configured by a brake fluid flow restriction portion separate from the housing, and the brake fluid flow restriction portion is attached in the pump discharge conduit in the housing.

9. The vehicle brake apparatus according to claim 8, wherein the brake fluid flow restriction portion is a cup-shaped portion having a bottom portion on which the at least one of the orifices is formed.

10. The vehicle brake apparatus according to claim 1, wherein all of the orifices are integrated in a housing.

11. A method of operating a vehicle brake apparatus comprising a brake fluid pressure generating portion, a brake force generating portion, a pump, a main conduit connecting the brake fluid pressure generating portion and the brake force generating portion, and a pump discharge conduit having a plurality of orifices connected in series for connecting the pump to the main conduit, the method including:

operating the brake force generating portion such that the brake force generating portion does not generate substantial brake pressure in the main conduit;

driving brake fluid into the pump discharge conduit from the pump; and passing the brake fluid through the plurality of orifices and into the main conduit, wherein orifice cross section areas of each of the plurality of orifices are smaller than a conduit cross section area of the pump discharge conduit, both before and after each of the plurality of orifices.

12. A method of operating a vehicle brake apparatus according to claim 11, wherein the main conduit is split into a first main conduit portion connecting the brake fluid pressure generating portion to a control valve, and a second main conduit portion connecting the control valve to the brake force generating portion, and wherein the brake fluid is passed through the plurality of orifices into the second main conduit portion.

13. A method of operating a vehicle brake apparatus according to claim 12, wherein the pump retrieves the brake fluid that is driven into the pump discharge conduit from the first main conduit portion.

14. A method of operating a vehicle brake apparatus according to claim 11, wherein the pump retrieves the brake fluid that is driven into the pump discharge conduit from a reservoir connected to the pump.

15. A method of operating a vehicle brake apparatus according to claim 11, further comprising passing the brake fluid through a damper formed in the pump discharge conduit prior to passing the brake fluid through the plurality of orifices.

16. A vehicle brake apparatus comprising:

a brake fluid pressure generating portion for generating brake fluid pressure based on brake pedal operation that is operable according to a requisite braking force;

a brake force generating portion for generating the requisite braking force based on the brake fluid pressure generated by the brake fluid pressure generating portion;

a main conduit connected to the brake fluid pressure generating portion for transmitting the brake fluid pressure to the brake force generating portion;

a pump for sucking and discharging brake fluid;

a pump discharge conduit for transmitting the brake fluid discharged from the pump to the main conduit;

a damper for restricting pulsation of the brake fluid, the damper being located in the pump discharge conduit farther along a flow path of the brake fluid than the pump; and first and second orifices connected in series with one another with respect to brake fluid flow discharged from the pump, and for restricting the brake fluid flow, the first and second orifices being located in the pump discharge conduit farther along a flow pat of the brake fluid than the damper,
wherein orifice cross section areas of the first and second orifices are smaller than a conduit cross section area of the pump discharge conduit,
wherein the pump discharge conduit is divided into first, second, and third conduit segments,
wherein the first orifice is located between the first conduit segment and the second conduit segment, and
wherein the second orifice is located between the second conduit segment and the third conduit segment.

17. The vehicle brake apparatus according to claim 16, wherein all of the orifices are fixed type orifices in which a cross sectional area is fixed.

18. The vehicle brake apparatus according to claim 17, further comprising:
a housing including the pump discharge conduit;
wherein at least one of the orifices is integrated in the housing, and at least one of the orifices is formed by a brake fluid flow restriction portion separate from the housing, and the brake fluid restriction portion is attached in the pump discharge conduit in the housing.

19. The vehicle brake apparatus according to claim 18, wherein the brake flow restriction portion is a cup-shaped portion having a bottom portion on which the at least one of the orifices is formed.

20. A method of operating a vehicle brake apparatus comprising a brake fluid pressure generating portion, a brake force generating portion, a pump, a main conduit connecting the brake fluid pressure generating portion and the brake force generating portion, and a pump discharge conduit having a first and second orifices connected in series for connecting the pump to the main conduit, the method including:
operating the brake force generating portion such that the brake force generating portion does not generate substantial brake pressure in the main conduit;
driving brake fluid into the pump discharge conduit from the pump; and
passing the brake fluid through the first and second orifices and into the main conduit,
wherein orifice cross section areas of the first and second orifices are smaller than a conduit cross section area of the pump discharge conduit,
wherein the pump discharge conduit is divided into first, second, and third conduit segments,
wherein the first orifice is located between the first conduit segment and the second conduit segment, and
wherein the second orifice is located between the second conduit segment and the third conduit segment.

* * * * *